United States Patent
Struhl et al.

(10) Patent No.: US 11,234,417 B2
(45) Date of Patent: Feb. 1, 2022

(54) BEE FEEDER ASSEMBLY

(71) Applicant: Clifford Struhl, Syosset, NY (US)

(72) Inventors: Clifford Struhl, Syosset, NY (US); Raymond M. Schneider, Lodi, CA (US)

(73) Assignee: Clifford Struhl, Syosset, NY (US)

( * ) Notice: Subject to any disclaimer, the term of this patent is extended or adjusted under 35 U.S.C. 154(b) by 175 days.

(21) Appl. No.: 16/783,669

(22) Filed: Feb. 6, 2020

(65) Prior Publication Data
US 2020/0267946 A1 Aug. 27, 2020

Related U.S. Application Data

(60) Provisional application No. 62/810,558, filed on Feb. 26, 2019.

(51) Int. Cl.
*A01K 53/00* (2006.01)
*A01K 47/00* (2006.01)

(52) U.S. Cl.
CPC .............. *A01K 53/00* (2013.01); *A01K 47/00* (2013.01)

(58) Field of Classification Search
CPC ......... A01K 53/00; A01K 47/00; A01K 47/06
USPC .................................. 449/9–11, 48
See application file for complete search history.

(56) References Cited

U.S. PATENT DOCUMENTS

| | | | | |
|---|---|---|---|---|
| 37,310 A | * | 1/1863 | Strickler | A01K 53/00 449/10 |
| 69,428 A | * | 10/1867 | Harrison | A01K 53/00 449/10 |
| 1,116,923 A | * | 11/1914 | Rahn | A01K 53/00 449/10 |
| 1,414,284 A | * | 4/1922 | Jones | A01K 53/00 449/9 |
| 1,566,571 A | * | 12/1925 | Appleton | A01K 39/026 119/77 |
| 1,801,932 A | * | 4/1931 | Miller | A01K 39/026 119/77 |
| 2,001,463 A | * | 5/1935 | Kehrle | A01K 53/00 449/9 |
| 2,492,468 A | * | 12/1949 | Durben | A01K 53/00 449/9 |
| 2,588,370 A | * | 3/1952 | Elliott | A01K 47/00 449/9 |
| 3,343,186 A | * | 9/1967 | Dunand | A01K 47/00 449/9 |
| 3,835,487 A | * | 9/1974 | Grigg | A01K 53/00 449/11 |

(Continued)

FOREIGN PATENT DOCUMENTS

| | | | | |
|---|---|---|---|---|
| DE | 4037820 A1 | * | 6/1992 | A01K 53/00 |
| FR | 321007 A | * | 12/1902 | A01K 53/00 |

*Primary Examiner* — Lisa L Tsang
(74) *Attorney, Agent, or Firm* — Dilworth & Barrese, LLP.; Michael J. Musella, Esq.

(57) ABSTRACT

A bee feeder assembly including a tank having a bottom portion with an opening, and a cap removably attached to the opening of the tank. The cap includes a center component with a feeder having a plurality of feeding holes extending therethrough, and a rim extending outward from the center component, the rim having an upper surface and a lower surface. The rim may have a plurality of ridges on the lower surface. The feeder may extend below the lower surface of the rim.

16 Claims, 15 Drawing Sheets

(56) References Cited

U.S. PATENT DOCUMENTS

| | | | | |
|---|---|---|---|---|
| 3,924,573 | A | * 12/1975 | Thomas | A01K 5/015 |
| | | | | 119/61.57 |
| 4,250,581 | A | 2/1981 | Kindall | |
| 4,524,476 | A | * 6/1985 | Adams, IV | A01K 55/00 |
| | | | | 449/27 |
| 5,211,597 | A | * 5/1993 | Scott | A01K 47/00 |
| | | | | 449/27 |
| 10,485,225 | B1 | * 11/2019 | Jester | A01K 53/00 |
| 10,617,100 | B1 | * 4/2020 | Larsen | B65D 25/2802 |
| 2009/0241844 | A1 | * 10/2009 | Becattini, Jr. | A01K 7/005 |
| | | | | 119/51.5 |
| 2010/0107984 | A1 | * 5/2010 | Uffner | A01K 5/0128 |
| | | | | 119/61.5 |

* cited by examiner

Medium Box
6.25" deep

BEE FEEDER ASSEMBLY

TECHNICAL FIELD

The present disclosure relates generally to a feeder for a beehive and components thereof, and more particularly, to a bee feeder with a cover configured to more efficiently provide food to the hive.

BACKGROUND OF THE INVENTION

Feeder assemblies for beehives are well known. Feeder assemblies are used to provide a food source for the bees, particularly when other food sources are not available. Providing alternate food sources prevents the bees from consuming the honey already produced in the hive, thus increasing the hive's honey output.

Feeders are essential components for most managed bee colonies to ensure that bees can store food in the Fall if short on honey, have enough food to get through the Winter when stored honey may not be accessible and/or available, and raise brood (young bees) and build comb in the Spring when stored honey is not available and the nectar flow has not yet started. Most feeders place the syrup far away from the bees or in cold areas where it is not readily available, especially in cold weather, and their design are susceptible to drowning bees. Many use open troughs of syrup that are also messy, spill syrup and are difficult to handle, and create gaps in the hive that allow bees to escape.

Accordingly, it is desirable to provide an improved bee feeder assembly that overcomes deficiencies in the prior art.

SUMMARY OF THE INVENTION

Generally speaking, in accordance with the invention, an improved bee feeder assembly is provided.

In one embodiment of the invention, a bee feeder assembly is provided. The bee feeder assembly includes a tank defining an opening at a bottom portion thereof and a cap attachable to the tank to cover the opening. The cap includes a center component substantially covering the opening and defining a plurality of feeding holes therethrough, a collar attached to and extending outward from the center component, the collar having an upper surface and a lower surface, and a ridge defined on the lower surface of the collar.

Further provided is a bee feeder assembly including a tank having a bottom portion with an opening, and a cap removably attached to the opening of the tank. The cap has a center component with a feeder having a plurality of feeding holes extending therethrough, and a rim extending outward from the center component, the rim having an upper surface and a lower surface. The rim may have a plurality of ridges on the lower surface. The feeder may extend below the lower surface of the rim.

In some embodiments, the bee feeder has a plurality of removable feet, wherein the rim includes a plurality of receptacles configured to receive the plurality of removable feet. Each of the plurality of receptacles may have a first opening on the lower surface of the rim for receiving at least one of the removable feet in a raised configuration, and a second opening on the upper surface of the rim for receiving at least one of the removeable feet in a lowered configuration, wherein the bee feeder assembly has a first height in the raised configuration being greater than a second height of the bee feeder assembly in the lowered configuration. In some embodiments, the bee feeder assembly also has a plurality of centering pins extending from the center component, each of the centering pins having a distal end below the lower surface of the rim.

Further provided is a beehive including a box with a plurality of sidewalls and a bottom wall, the bottom wall having a box opening, and a bee feeder assembly including a tank having a bottom portion with a tank opening and a cap removably attached to the tank opening, the cap including a center component with a feeder having a plurality of feeding holes therethrough, a rim extending outward from the center component, the rim having an upper surface, a lower surface, and a plurality of ridges on the lower surface, the bee feeder assembly being positioned within the box with the feeder adjacent to the box opening.

In some embodiments, the center component of the cap includes a plurality of centering pins extending from the center component, each of the centering pins having a distal end below the lower surface of the rim, the centering pins extending at least partially into the box opening. In some embodiments, the beehive also includes a plurality of removable feet configured to engage into a plurality of corresponding receptacles in the rim of the cap, wherein the bee feeder assembly is configurable between a lowered configuration, and a raised configuration in which each of the plurality of removable feet are engaged into the plurality of receptacles via the lower surface of the rim.

Other embodiments of the invention will be apparent from the drawings and the specification to follow and the scope of the invention will be indicated in the claims.

BRIEF DESCRIPTION OF THE DRAWINGS

The present disclosure will become more readily apparent from the specific description accompanied by the following drawings, in which:

FIGS. 1-15 illustrate various embodiments of a bee feeder assembly and a beehive according to the present disclosure.

FIGS. 1 and 2 illustrate an embodiment of a bee feeder assembly in accordance with aspects of the present disclosure;

FIG. 3 illustrates an embodiment of a bottle or tank of a bee feeder assembly in accordance with aspects of the present disclosure;

FIGS. 4-8 illustrate an embodiment of the cap of a bee feeder assembly in accordance with aspects of the present disclosure;

FIGS. 10-13 illustrate various embodiments of the bee feeder assembly in a beehive in accordance with aspects of the present disclosure;

FIG. 14 illustrates a foot of the bee feeder assembly in accordance with aspects of the present disclosure; and FIG. 15 illustrates a further embodiment of a bee feeder assembly in a beehive in accordance with aspects of the present disclosure.

Throughout the disclosure, like reference numerals will be used to indicate similar elements.

DETAILED DESCRIPTION

Figure 1:
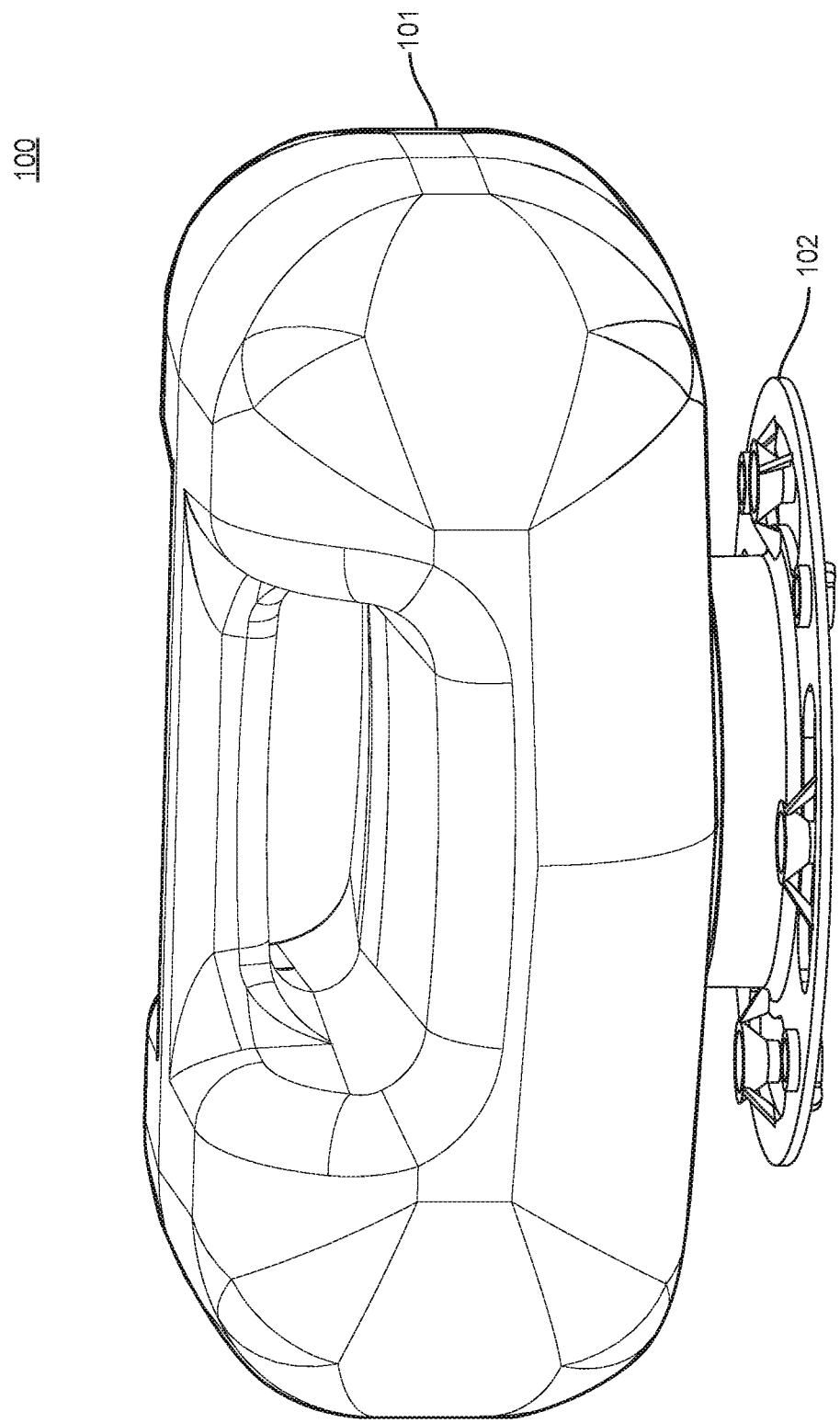

The present disclosure may be understood more readily by reference to the following detailed description, taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments, by way of example only, and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. In particular, they are intended to refer to the spatial reference of the display stand in its normal, assembled configuration during intended use.

The present disclosure describes a bee feeder assembly provides features and benefits that address limitations and shortcoming of existing hive feeders (Boardman, Miller style, etc.) and outside feeders. The bee feeder assembly according to the present disclosure offers bees easier access to syrup/liquid food and faster feeding year-round, plus its universal, single size, design fits different hive sizes allowing it to be interchanged between hives thus eliminating specialized feeders. In addition, the bee feeder can be placed directly over the inner cover of a hive and ribs on its lower surface allow for ventilation while also eliminating the passage of bees in and out of the hive. Removable feet/risers lift the feeders to allow access to multiple feeders placed in a hive.

The bee feeder assembly according the present disclosure places the syrup directly above the heat column in the hive or within inches of the opening in the inner cover and the sealed tank prevents spills and mess, plus tanks can be swapped quickly and easily without disturbing the bees.

The bee feeder assembly according the present disclosure takes feeders to a new level by integrating many design elements that are not possible with conventional designs to create a user-friendly sealed unit that can be used year-round and accommodate multiple hive sizes.

The bee feeder assembly according to the present disclosure will now be described with respect to the drawings.

Figure 2:
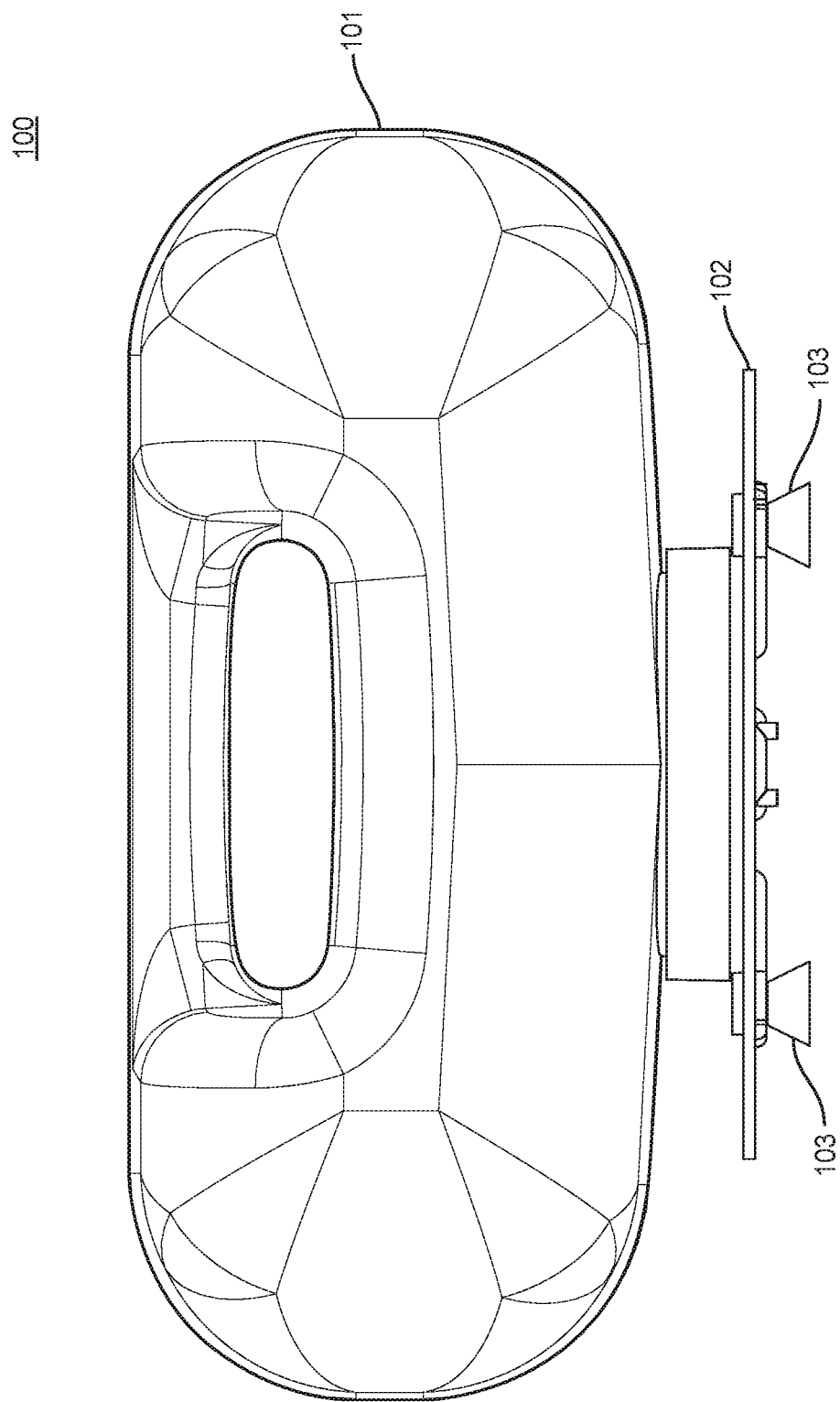
Figure 3:
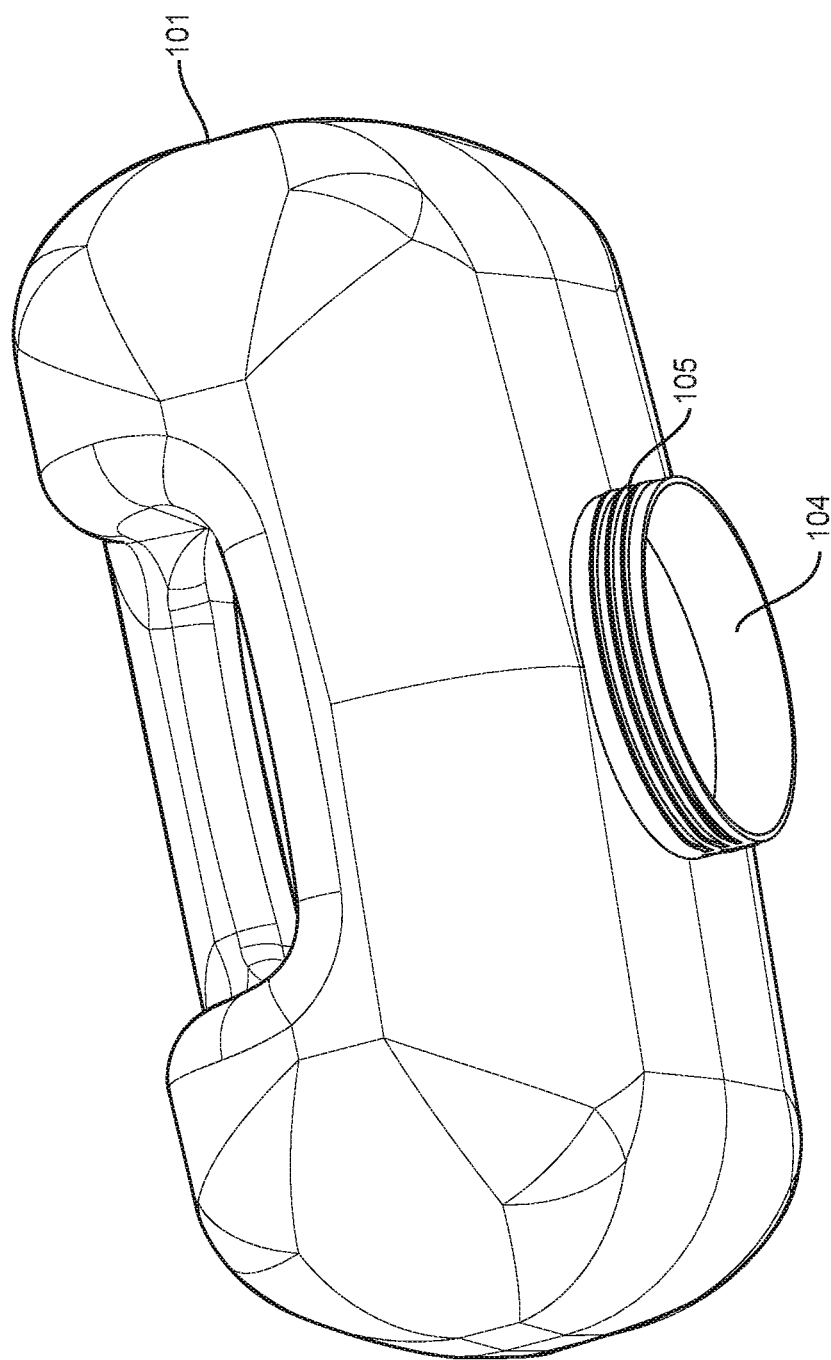

FIGS. 1-3 illustrate an embodiment of a bee feeder assembly 100 in accordance with aspects of the present disclosure. As described in more detail below, FIG. 1 shows the bee feeder assembly 100 in a normal or lowered configuration while FIG. 2 shows the bee feeder assembly 100 in raised configuration.

Referring to FIGS. 1-4, the bee feeder assembly 100 includes a bottle or tank 101 and a base or cap 102 removably attached thereto. In the exemplary embodiment, the tank 101 includes an opening 104 defined by a neck portion of the tank 101 having threads 105 on an exterior surface thereof. The tank 101 can be filled with bee food in the form of a liquid or syrup through opening 104. In addition to providing food to the bees, the bee feeder assembly 100 can function as a water dispenser for the bees. The cap 102 is attachable to tank 101 via a threaded engagement between the threads 105 on the neck of the tank 101 and threads 106 inside a center component 109 of the cap 102; other means of connecting cap 102 to tank 101 are contemplated. The center component 109 of the cap 102 may also include a gasket to provide a seal between the tank 101 and the cap 102 (see, e.g., FIG. 9E).

Tank 101 is further illustrated in FIG. 3. Tank 101 can be of any varying shapes and sizes, but should be small enough to fit (together with the rest of the feeder assembly 100) within a beehive box 120, for example, as shown in FIG. 10. Tank 101 can be further designed such that the interior bottom surface shape encourages flow toward the opening 104. For example, as shown in FIGS. 2 and 9H, the bottom walls of the tank 101 may be sloped towards the opening 104.

Referring to FIGS. 4-8, the cap 102 is designed to support and balance tank 101 in a steady and secure manner, especially when filled with bee food. In order to accomplish this, cap 102 includes a collar or rim 108 that extends outward from a center component 109. The cap 102 includes a plurality of receptacles 107 and a plurality of removable feet 103, such as four of each. In the exemplary embodiment, the receptacles 107 extend through the collar 108 each having an upper opening and a lower opening.

Figure 4:
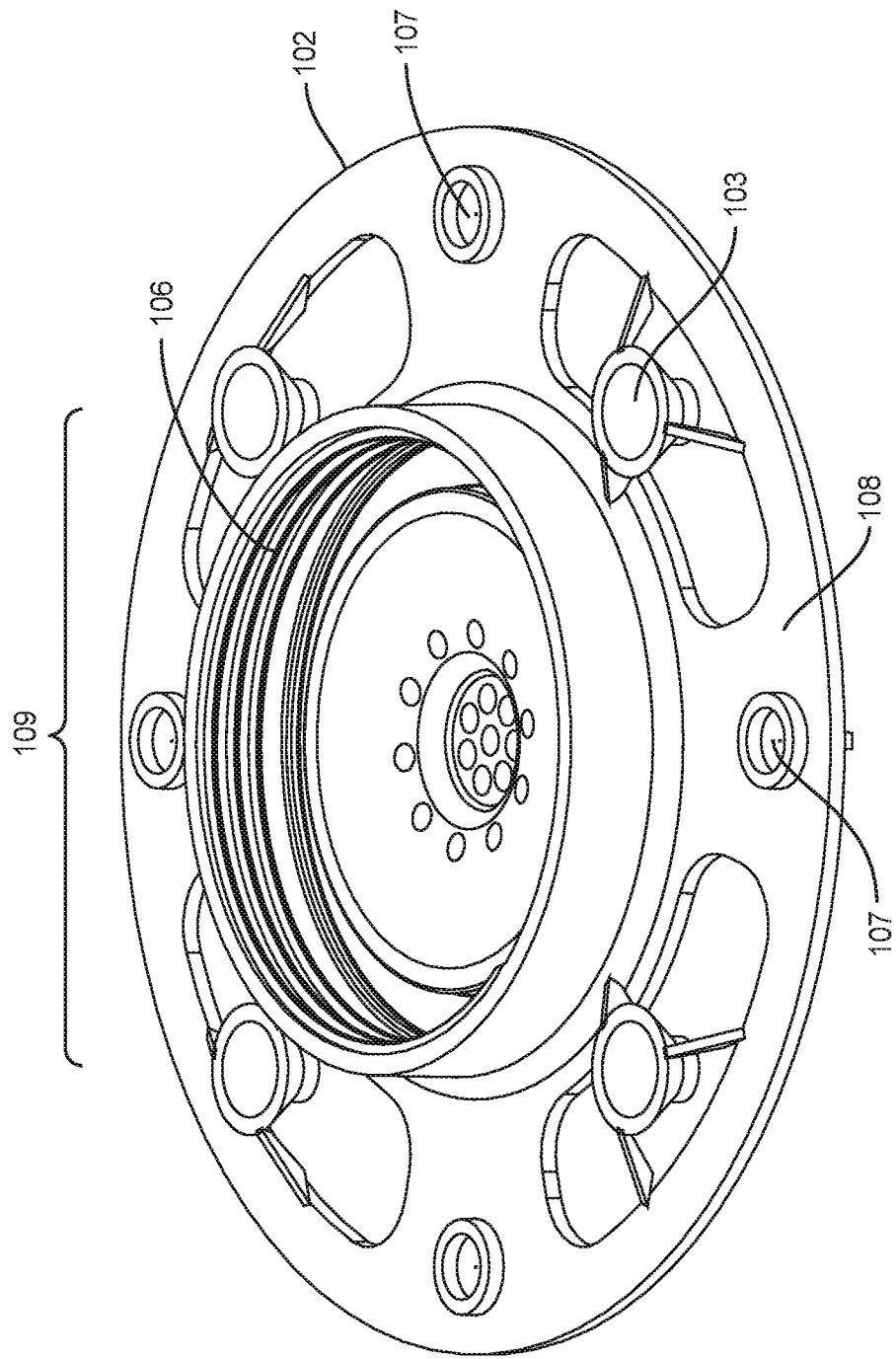
Figure 5:
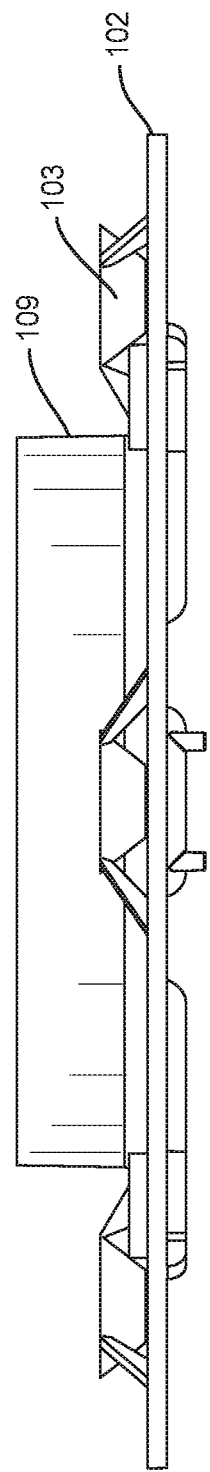

As shown in FIGS. 4-5, the removable feet 103 may be stowed in mounts on the upper surface of the collar 108 of the cap 102. In some embodiments, the feet 103 are attached to or partially formed together with the mounts during manufacturing in a breakout configuration. Once the feet 103 are broken out of the mounts, they can removably reattached to and detached from the collar 108 as needed. In particular, each of the removable feet 103 includes a base portion and a connector portion for interfacing with the collar 108. The connector portion may be fitted into the upper opening of a receptacle 107 for storage, or into a lower opening of a receptacle 107 to raise the height of the feeder assembly 100.

Figure 6:
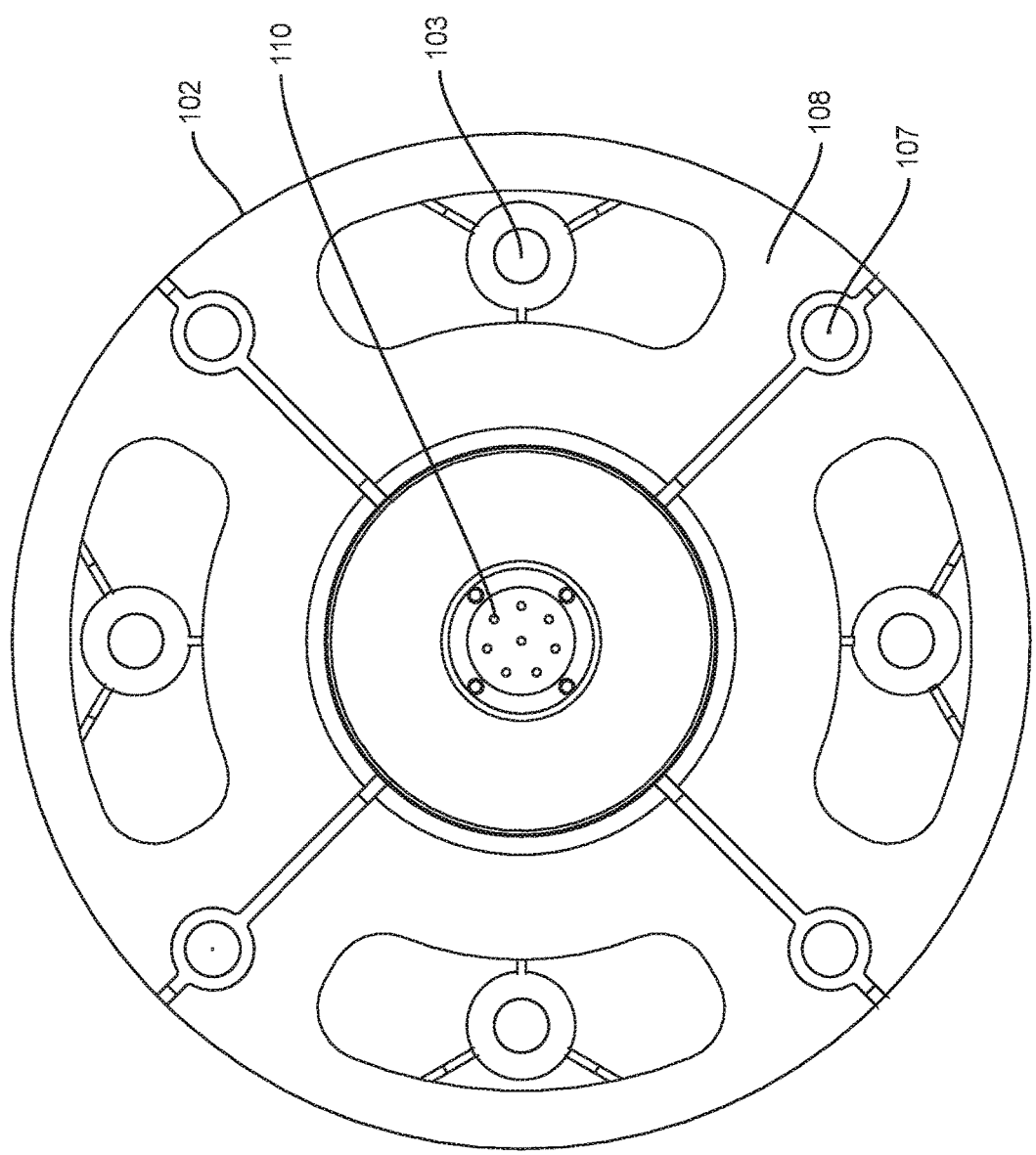
Figure 7:
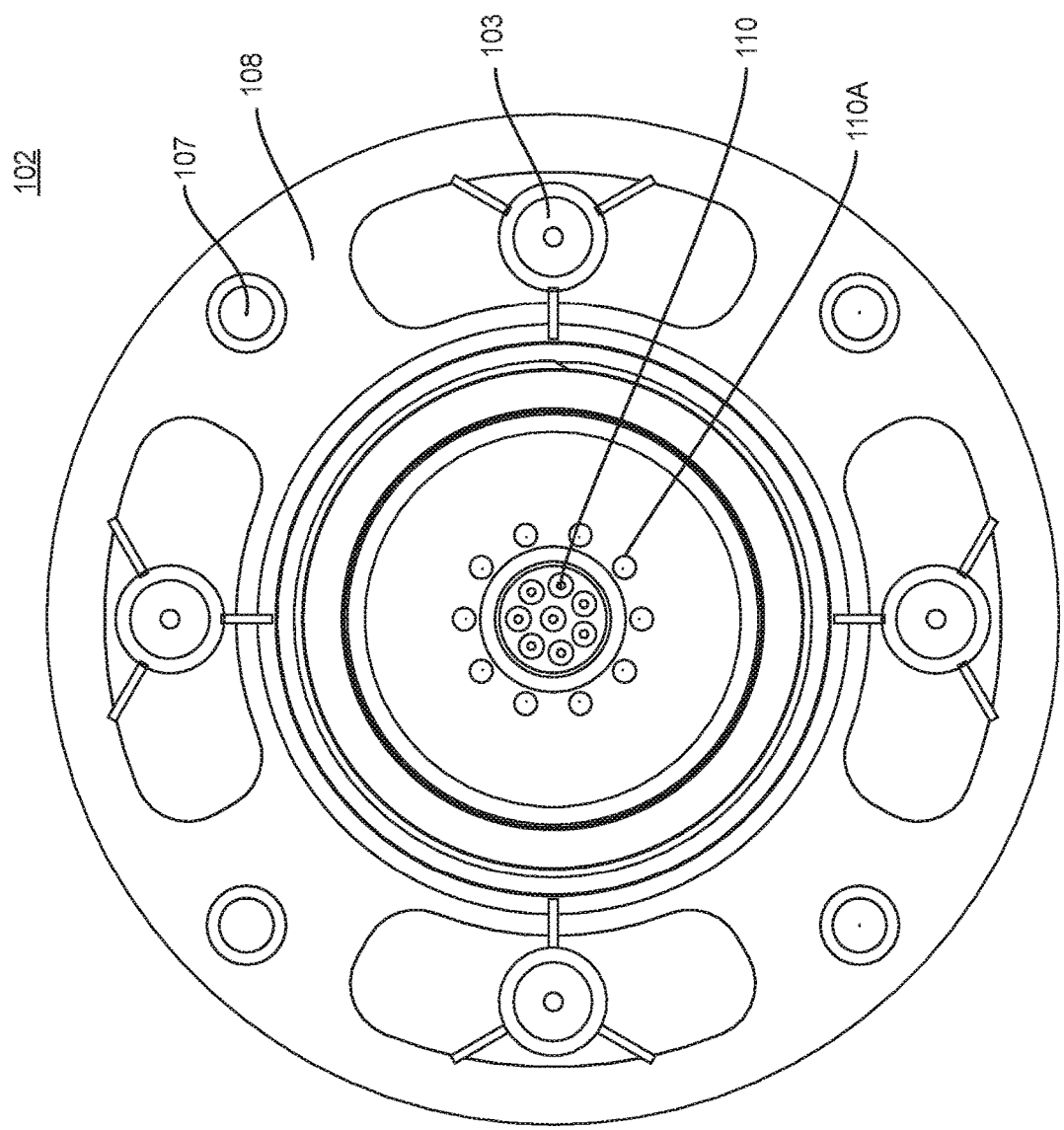
Figure 8:
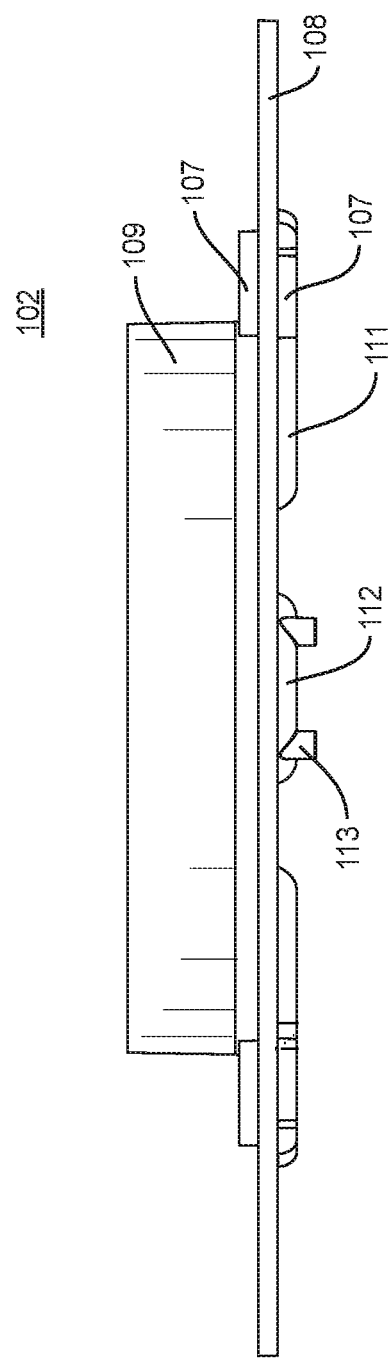

FIGS. 6 and 7 are bottom and top views, respectively, of the cap 102 with the feet 103 stowed in the mounts (e.g., in a breakout configuration). FIG. 8 is a side view of the cap 102 with the feet 103 removed from the mounts. As shown in FIGS. 6-8, the cap 102 includes a feeding portion or nipple 112 in the center component 109 which, in the exemplary embodiment, has a plurality of holes 110 and a plurality of indents 110A. The nipple 112 may have one or more centering or alignment pins 113 extending downward from an outer circumference of the nipple 112. As shown in FIGS. 6 and 8, the bottom of the cap 102 may also include a plurality of ribs or ridges 111 extending outward from the center component 109. The ribs 111 define the lower surface of the collar 108 while leaving space between the ribs 111 for air flow.

Figure 9A:
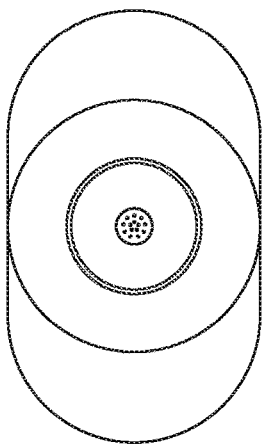
FIGS. 9A-9H illustrate an embodiment of a bee feeder assembly in accordance with aspects of the present disclosure.
Figure 9B:
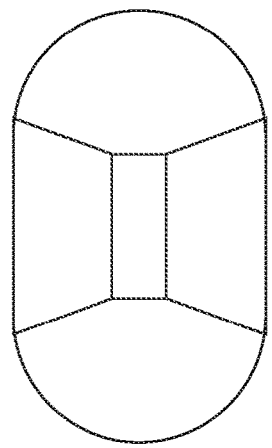
Figure 9C:
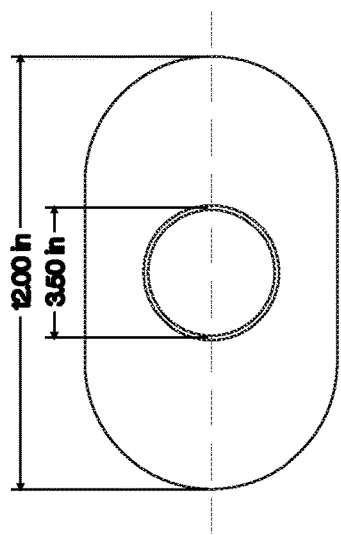
Figure 9D:
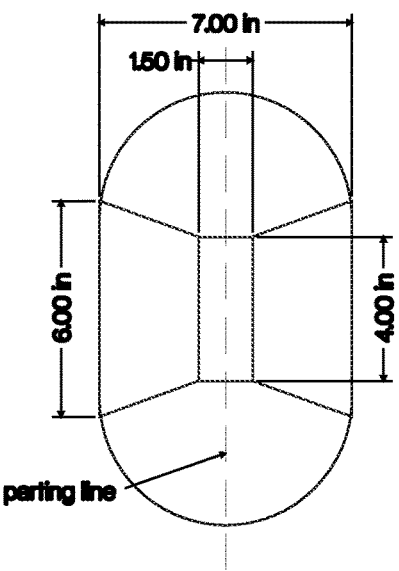
Figure 9E:
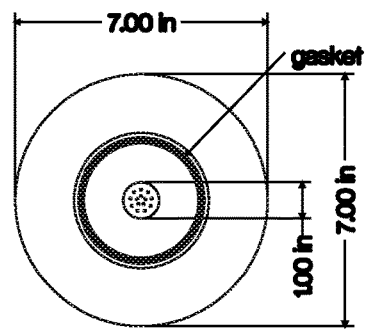
Figure 9F:
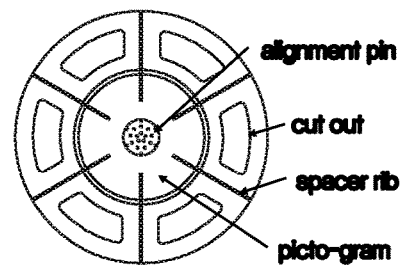
Figure 9G:
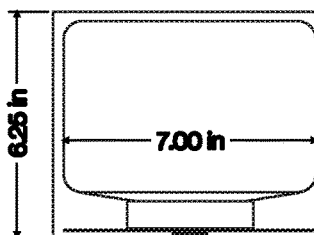
Figure 9H:
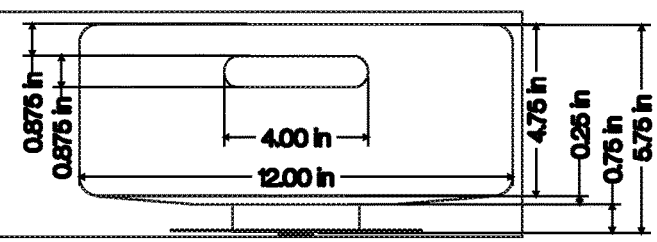
Figure 10:
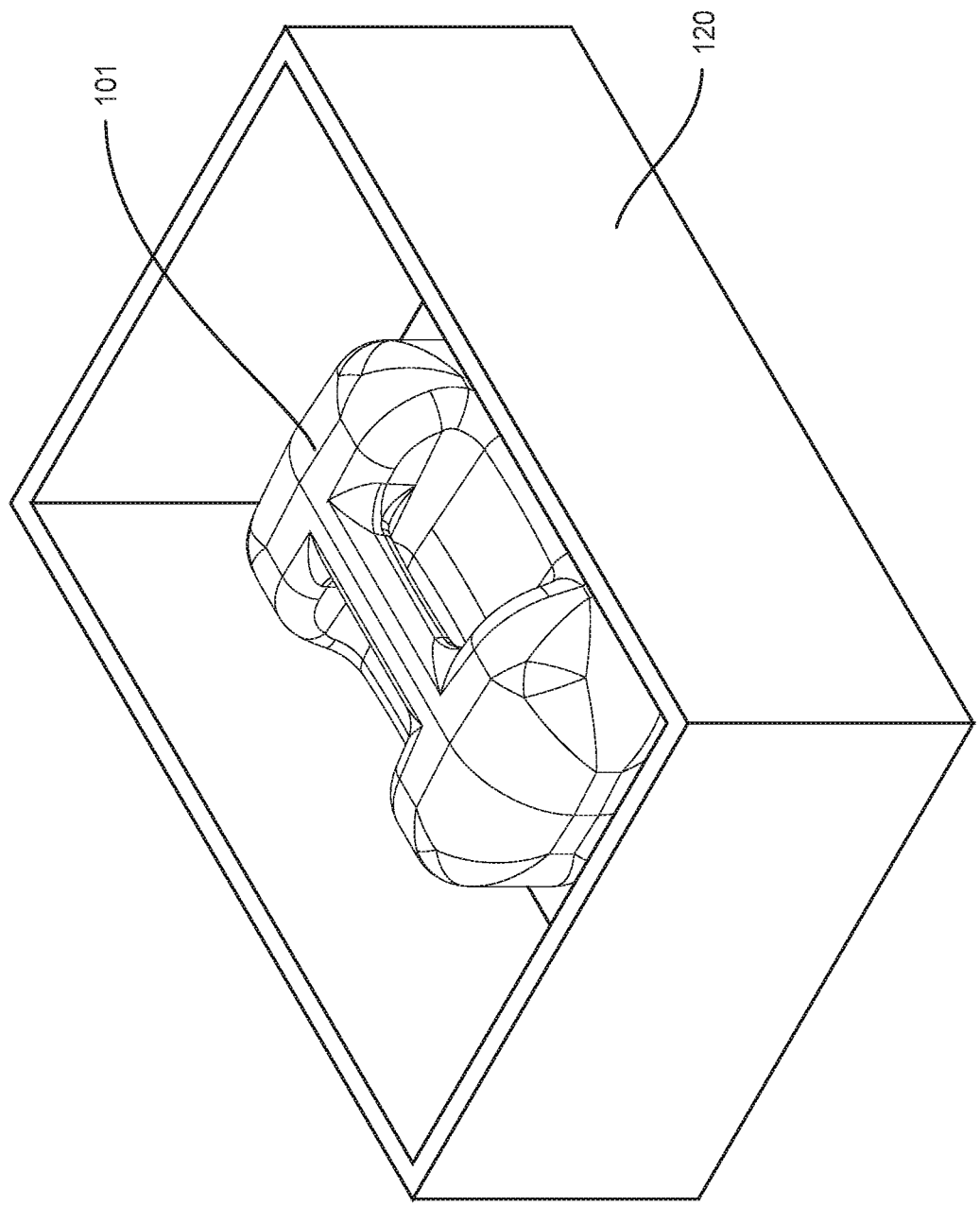

FIGS. 9A-9H further illustrate the feeder assembly 100, the tank 101, and the cap 102. FIGS. 9A-9B are bottom and top views, respectively, of the feeder assembly 100. FIGS. 9C-9D are bottom and top views, respectively, of the tank 101. FIGS. 9E-9F are top and bottom views, respectively, of the cap 102. FIGS. 9G-9H are front and side views, respectively, of the feeder assembly 100.

FIGS. 9C-9H provide specific dimensions and views of a preferred embodiment of a bee feeder assembly 100 in accordance with aspects of the present disclosure. For example, the tank 101 may have a length of approximately twelve (12) inches, a width of approximately seven (7) inches, and a height of approximately five (5) inches. The opening 104 of the tank 101 may have a diameter of approximately three and a half (3.5) inches. The integrated handle of the tank 101 has a length of four (4) inches and a width of one and a half (1.5) inches in the exemplary embodiment. Further, in the exemplary embodiment, the cap 102 has a diameter of seven (7) inches with a one (1) inch diameter feeder. These dimensions are exemplary and can be modified according to particular applications or requirements.

Figure 11:
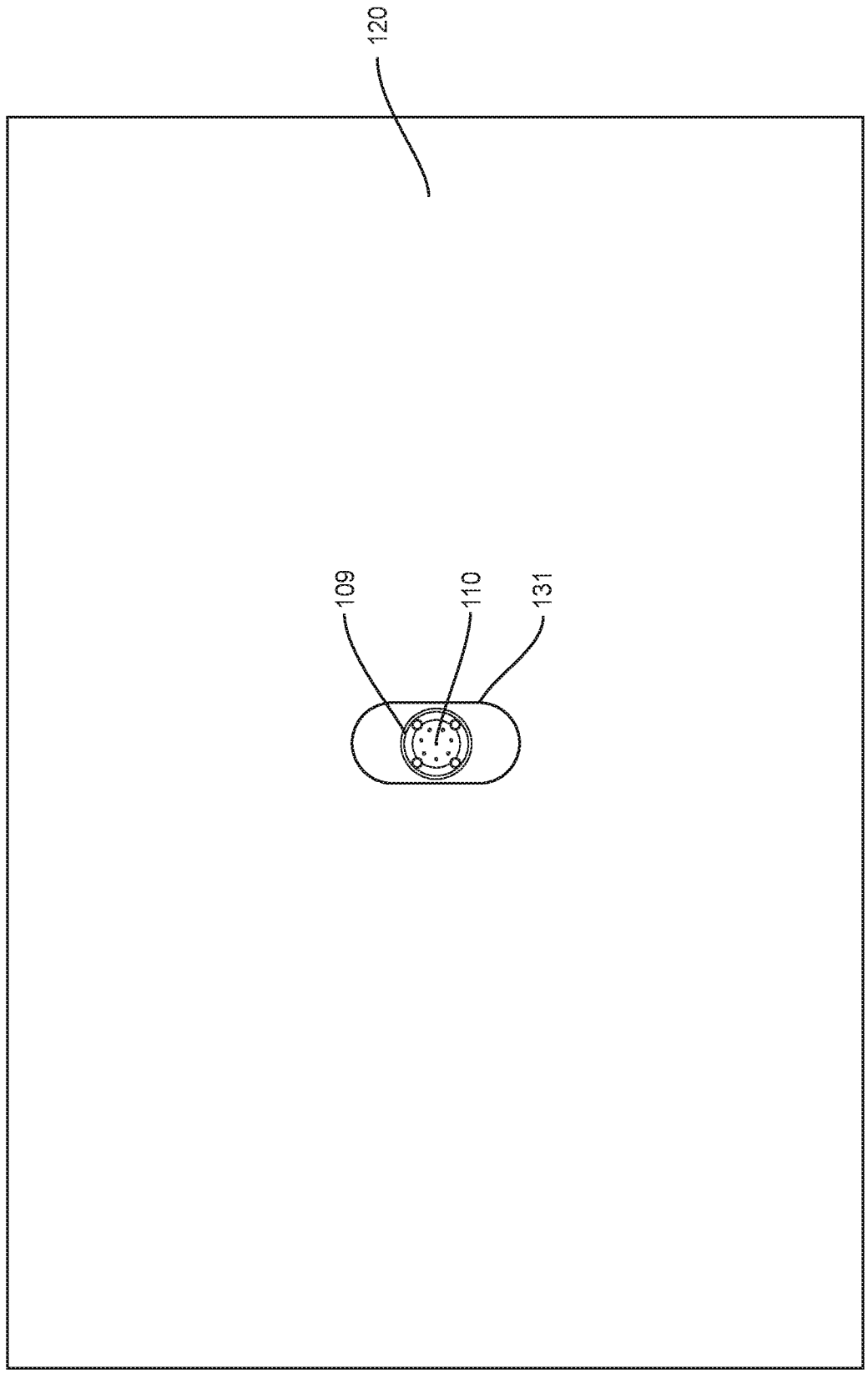

FIGS. 10 and 11 illustrate the bee feeder assembly 101 in a beehive box 120. As one skilled in the art will understand, beehives are often comprised of one or a plurality of boxes stacked upon one another, at least some of the boxes including a plurality of frames (not shown). One of the boxes, preferably a top box in the stack, in a beehive according to the present disclosure may include the feeder assembly 100. The beehive box 120 has a plurality of sidewalls defining a length and a width, a bottom wall, and in some embodiments a top wall or top cover (not shown). The feeder assembly 100 is sized to fit within the box 120, i.e., having a length and width less than the corresponding length and width of the interior of the box 120 and a height (e.g., in the raised configuration) less than a height of the sidewalls. The beehive box 120 includes a feeding hole 131 in the bottom wall. The bee feeder assembly 100 is configured such that the feeding nipple 112 may be positioned above and/or within the feeding hole 131 of the beehive box 120.

Figure 12:
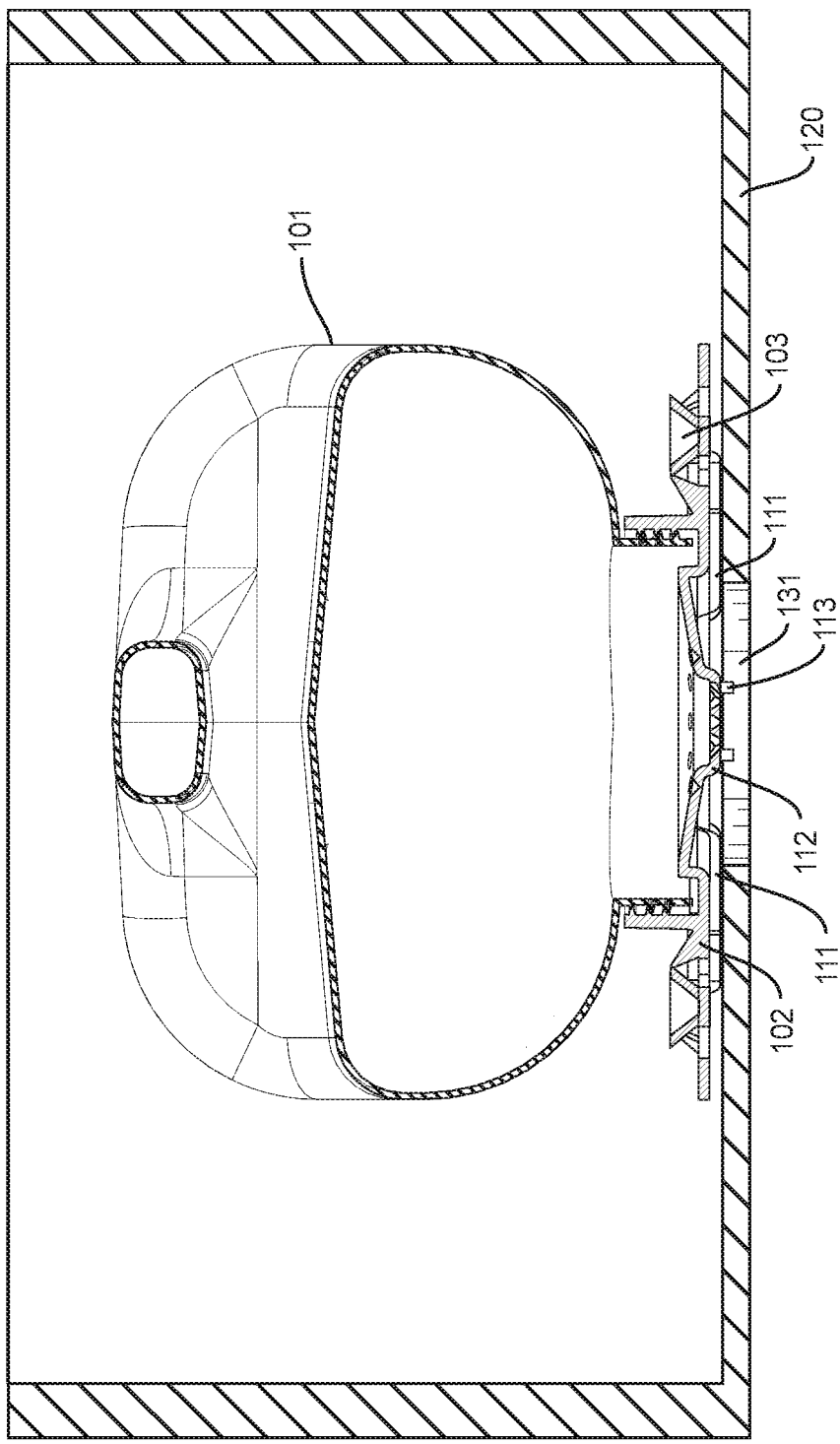

In the exemplary embodiment, the feeding nipple 112 extends downward and below the lower surface of the collar 108 (e.g., below the ridges 111). A plurality of holes 110 and indents 110A can be defined on the nipple 112. The number and size of the holes 110 is selected to provide proper dispensing of the feed syrup from the tank 101. Indents 110A can be punched or drilled open to provide further feeding capacity. In addition, holes 110 can be easily closed with hive wax to decrease the number of holes 110 and reduce feeding capacity. Centering pins 113 extend downward from a lower surface of the nipple 112, preferably positioned radially outboard of the holes 110 and indents 110A and/or adjacent to an outer circumference of the nipple 112. The centering pins 113 on feeding nipple 112 are provided to keep the feeder assembly 100 positioned over the feeding hole 131 in the hive box 120, as shown for example, in FIG. 12.

Figure 13:
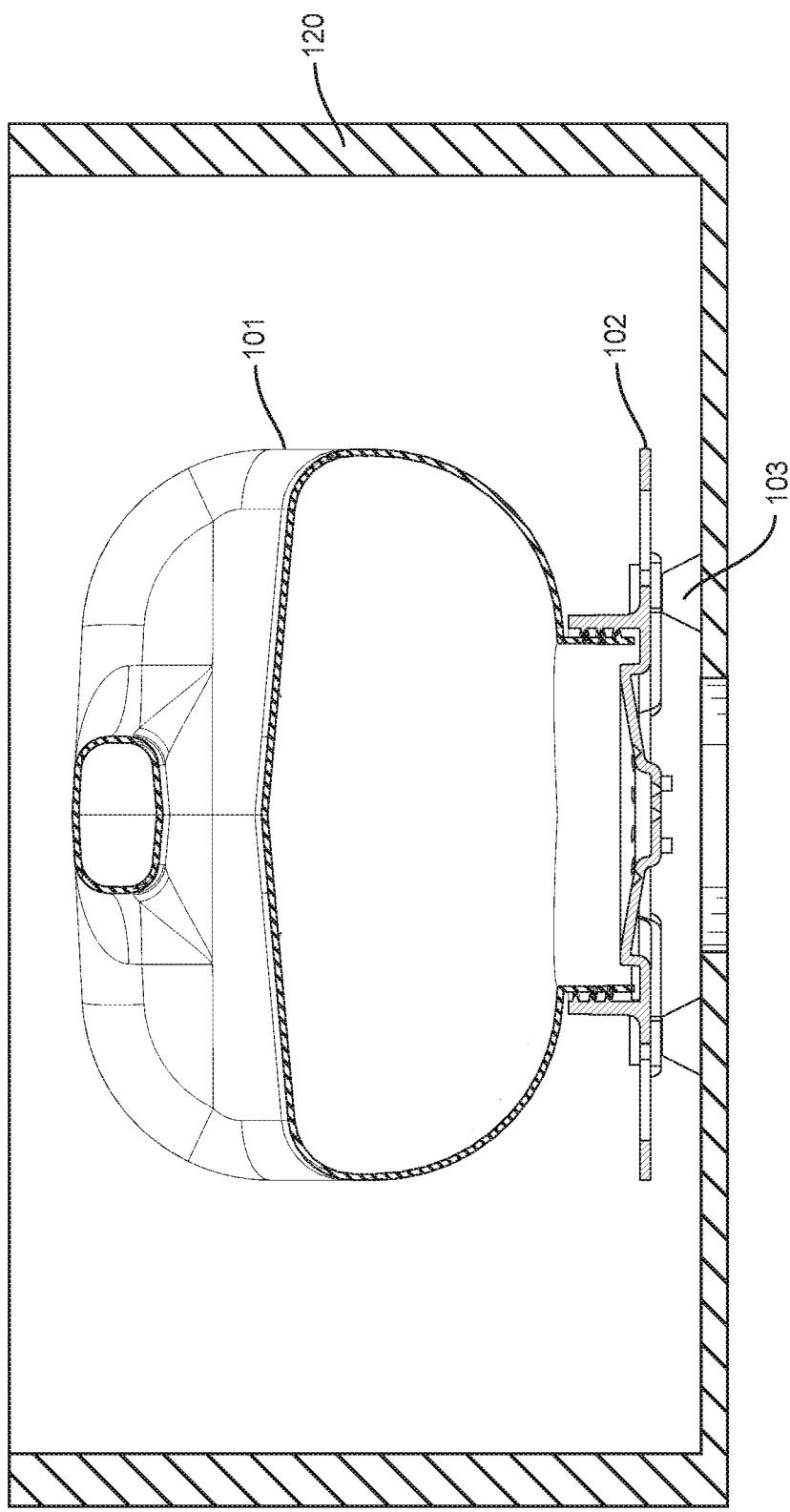

As discussed above, there are two configurations for the feeder system, normal (or lowered) and raised. The normal configuration is illustrated, for example, in FIG. 12, and the raised configuration is illustrated for example in FIG. 13. In the normal configuration, the ridges 111 are used to support and at least partially raise the feeder assembly 100 off an interior surface of the bottom wall of the hive box 120. Whereas in the raised configuration, feet 103 are used to raise the feeder assembly 100 off a surface of the hive box 120. Although the bee feeder assembly 100 is described herein used in connection with a beehive box 120, the bee feeder assembly 100 can be used as a stand-alone unit outside of a beehive box.

In the normal configuration, the spacing between the underside of the collar 108 and the hive box 120 is smaller than the size of a honey bee, thus preventing the bees from bypassing the feeder assembly 100 and entering the hive box 120 (see, e.g., FIG. 12), which is typically closed with a hive box top (not shown). The spacing is created by the ridges 111 on the underside of the collar 108. In the normal configuration, the feet 103 are not used and can be stored on the upper side of the collar 108 in the receptacles 107. As discussed above, the cap 102 can be manufactured to include the feet 103 in a breakout configuration. Once the feet 103 are detached they can be fitted into the receptacles 107.

In the raised configuration, the feet 103 are inserted into the receptacles 107 on the under sider of the collar 108. In the raised configuration, the spacing between the underside of the collar 108 and the hive box 120 is greater than the size of a honey bee, thus permitting the bees to bypass the feeder assembly 100 and enter the hive box 120 (see, e.g., FIG. 13), which is typically closed with a hive box top (not shown).

Figure 15:
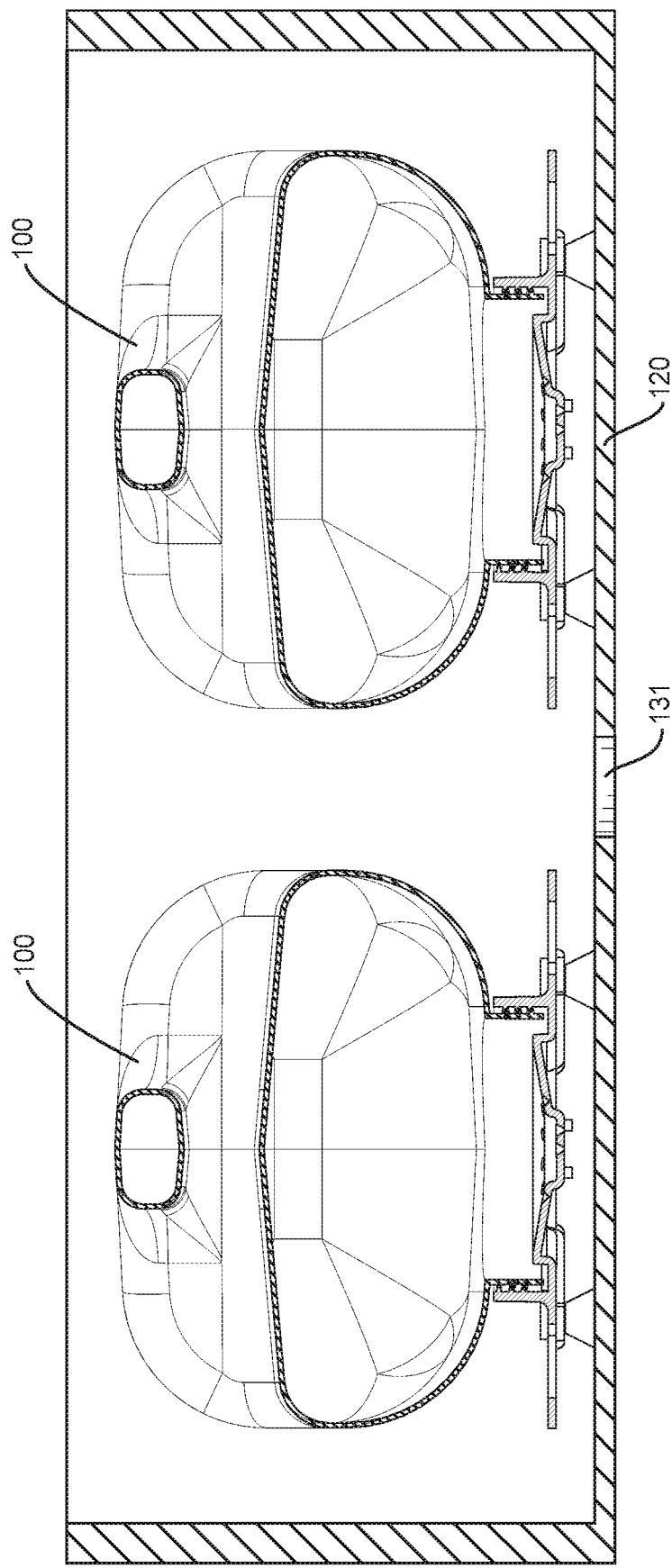

The raised configuration may be useful, for example, when the feeding nipple 112 is not positioned over the hole 131 in the hive box 120. This permits bees to fit under the nipple 112, whereas without the feet 103, the nipple is flush with or below the plane of the collar 108. As shown in FIG. 15, in the raise configuration bees can access the feeding nipple 112 even when it is not positioned over the hole 131 in the hive box 120.

In addition, when in the raised configuration, two feeder assemblies can fit side-by-side in a standard hive box. As illustrated in FIG. 15, two feeder assemblies 100 are positioned within hive box 120.

Figure 14:
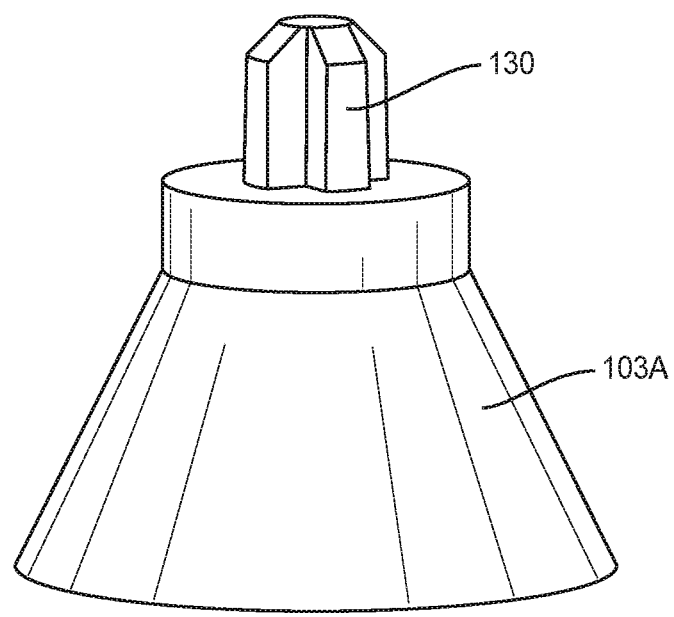

Different variations of the feet 103 are contemplated. In some embodiments, the connector portion may be cylindrical with a flat top to fit into cylindrical recesses 107 (see, e.g., FIGS. 6-7) on upper and lower sides of the collar 108. In other embodiments, the connector portions of the feet may be shaped or keyed. For example, FIG. 14 illustrates a foot 103A with a keyed connector portion 130 that may be accepted into the same receptacles 107 or alternatively into receptacles keyed to accept the shape of connector portion 130. The feet 103/103A may also have different heights, widths, and shapes to accommodate different applications or requirements.

The bee feeder assembly according to an embodiment of the present disclosure is ideal for all season feeding. The bee feeder assembly according to an embodiment of the present disclosure provides the bees with fast and easier access to the feed syrup. The bee feeder assembly according to an embodiment of the present disclosure is user friendly; no mess, no fuss, no spills, no hassles. The bee feeder assembly according to an embodiment of the present disclosure minimize bee loss; no drowning. The bee feeder assembly according to an embodiment of the present disclosure includes an exclusive and easy to use EZ-GRIP handle. The bee feeder assembly according to an embodiment of the present disclosure has a 1-gallon capacity, though the bee feeder assembly can be manufactured in different sizes and capacities.

The bee feeder assembly according to an embodiment of the present disclosure can swap tanks out in seconds; no tools, no hassles. The bee feeder assembly according to an embodiment of the present disclosure fits in any size medium box; e.g., 8-frame or 10-frame. The bee feeder assembly according to an embodiment of the present disclosure also fits in the smaller NUC (nucleus) hives, which can typically include 4 or 5 frames.

The bee feeder assembly according to an embodiment of the present disclosure puts feeding nipple directly over hole in inner cover for fast access. The bee feeder assembly according to an embodiment of the present disclosure includes alignment pins that keep tank centered in hive. The bee feeder assembly according to an embodiment of the present disclosure includes starter indents for additional holes for faster feeding, and can adjust feeding rate, if needed, by plugging holes with wax.

The bee feeder assembly according to an embodiment of the present disclosure can include one (1) inch diameter feeding area with multiple holes eliminates crowding. The bee feeder assembly according to an embodiment of the present disclosure works in any weather, bees never leave nest area. The bee feeder assembly according to an embodiment of the present disclosure makes hive inspections easier. The bee feeder assembly according to an embodiment of the present disclosure provides no heavy boxes with slopping syrup, robbing or burr comb. The bee feeder assembly according to an embodiment of the present disclosure there is no more balancing or spilling open trays of syrup. The bee feeder assembly according to an embodiment of the present disclosure is a compact sealed system, no exposed syrup. The bee feeder assembly according to an embodiment of the present disclosure has support ribs allow ventilation through hole in inner cover. The bee feeder assembly according to an embodiment of the present disclosure has a large seven (7) inch diameter flange for stability.

The bee feeder assembly according to an embodiment of the present disclosure prevents bees from escaping; inspect the food level without suiting up, as the bees cannot maneuver passed the nipple through the hole. The bee feeder assembly according to an embodiment of the present disclosure has large diameter hole for easy/quick filling. The bee feeder assembly according to an embodiment of the present disclosure is made of translucent material makes it easy to see level. The bee feeder assembly according to an embodiment of the present disclosure has self-storing feet allow up to two tanks to fit in 8-frame and 10-frame boxes, and one tank in a NUC box. The bee feeder assembly according to an embodiment of the present disclosure has feet raise tank for bees to access nipple when not over hole.

The bee feeder assembly according to an embodiment of the present disclosure is a techno-polymer construction will not rot; resists sticking from propolis. The bee feeder assembly according to an embodiment of the present disclosure is easy to clean, virtually maintenance free. The bee feeder assembly according to an embodiment of the present disclosure is priced less than other feeders.

Components of the system can be fabricated from materials suitable for outdoor environments, including, but not limited to, metal(s), plastic(s), glass(es), wood(s), combinations thereof, etc. Various components of the system may be fabricated from material composites, including the above materials, to achieve various desired characteristics such as strength, rigidity, elasticity, flexibility, compliance, performance, and durability. The components of the system, individually or collectively, may also be fabricated from a heterogeneous material such as a combination of two or more of the above-described materials.

Where this application has listed the steps of a method or procedure in a specific order, it may be possible, or even expedient in certain circumstances, to change the order in which some steps are performed, and it is intended that the particular steps of the method or procedure claim set forth here below not be construed as being order-specific unless such order specificity is expressly stated in the claims.

While the embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A bee feeder assembly, comprising:
    a tank having a bottom portion with an opening; and
    a cap removably attached to the opening of said tank, said cap including:
        a center component with a feeder having a plurality of feeding holes extending therethrough, and
        a rim extending outward from the center component, the rim having an upper surface and a lower surface; and
        a plurality of removable feet, wherein the rim includes a plurality of receptacles configured to receive the plurality of removable feet;
        wherein each of the plurality of receptacles has a first opening on the lower surface of the rim for receiving at least one of the removable feet in a raised configuration, and a second opening on the upper surface of the rim for receiving the at least one of the removable feet in a lowered configuration, and
        wherein the bee feeder assembly has a first height in the raised configuration being greater than a second height of the bee feeder assembly in the lowered configuration.

2. The bee feeder of claim 1, wherein each of the removeable feet has a lower base and an upper connection portion sized to fit into at least one of the receptacles.

3. The bee feeder assembly of claim 1, wherein each of the plurality of removable feet are removably secured in the rim in a breakout configuration.

4. The bee feeder assembly of claim 1, wherein the feeder extends below the lower surface of the rim.

5. The bee feeder assembly of claim 4, wherein the rim includes a plurality of ridges defining the lower surface.

6. The bee feeder assembly of claim 1, further comprising a plurality of centering pins extending from the center component, each of the centering pins having a distal end below the lower surface of the rim.

7. The bee feeder assembly of claim 1, wherein said tank has a top portion with an integrated handle.

8. The bee feeder assembly of claim 1, wherein said cap is removably attached to said tank with a threaded engagement.

9. The bee feeder assembly of claim 8, wherein the tank includes a neck defining the opening having threads on an exterior surface of the neck, and wherein the center component of the cap includes threads on an interior surface.

10. The bee feeder assembly of claim 9, further comprising a gasket in the center component of the cap.

11. The bee feeder assembly of claim 1, wherein the bottom portion of the tank includes surfaces slopped towards the opening.

12. A bee feeder assembly, comprising:
    a tank having a bottom portion with an opening; and
    a cap removably attached to the opening of said tank, said cap including:
        a center component with a feeder having a plurality of feeding holes extending therethrough, and
        a rim extending outward from the center component, the rim having an upper surface and a lower surface, and
    wherein the feeder extends below the lower surface of the rim; and
        a plurality of removable feet, wherein the rim includes a plurality of receptacles configured to receive the plurality of removable feet;
        wherein each of the plurality of receptacles has a first opening on the lower surface of the rim for receiving at least one of the removable feet in a raised configuration, and a second opening on the upper surface of the rim for receiving the at least one of the removable feet in a lowered configuration, and wherein the bee feeder assembly has a first height in the raised configuration being greater than a second height of the bee feeder assembly in the lowered configuration.

13. The bee feeder assembly of claim 12, wherein the center component of said cap includes a plurality of centering pins extending from the center component, each of the centering pins having a distal end below the lower surface of the rim.

14. The bee feeder of claim 13, wherein the rim includes a plurality of ridges defining the lower surface.

15. A beehive, comprising:
 a box including a plurality of sidewalls and a bottom wall, the bottom wall having a box opening;
 a bee feeder assembly including a tank having a bottom portion with a tank opening and a cap removably attached to the tank opening, the cap including a center component with a feeder having a plurality of feeding holes therethrough, a rim extending outward from the center component, the rim having an upper surface, a lower surface, and a plurality of ridges on the lower surface;
 said bee feeder assembly being positioned within said box with the feeder adjacent to the box opening; and
 a plurality of removable feet, wherein the rim includes a plurality of receptacles configured to receive the plurality of removable feet;
 wherein each of the plurality of receptacles has a first opening on the lower surface of the rim for receiving at least one of the removable feet in a raised configuration, and a second opening on the upper surface of the rim for receiving the at least one of the removable feet in a lowered configuration, and
 wherein the bee feeder assembly has a first height in the raised configuration being greater than a second height of the bee feeder assembly in the lowered configuration.

16. The beehive of claim 15, wherein the center component of the cap includes a plurality of centering pins extending from the center component, each of the centering pins having a distal end below the lower surface of the rim, the centering pins extending at least partially into the box opening.

* * * * *